(12) United States Patent
Goto et al.

(10) Patent No.: US 12,515,948 B2
(45) Date of Patent: Jan. 6, 2026

(54) MICRO VIBRATION BODY HAVING THREE-DIMENSIONAL CURVED SURFACE SHAPE AND METHOD FOR MANUFACTURING THE SAME

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Katsuaki Goto, Nisshin (JP); Shota Harada, Nisshin (JP); Keitaro Ito, Nisshin (JP); Yuuki Inagaki, Nisshin (JP); Takahiko Yoshida, Nisshin (JP); Yusuke Kawai, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 501 days.

(21) Appl. No.: 17/884,111

(22) Filed: Aug. 9, 2022

(65) Prior Publication Data
US 2023/0061042 A1 Mar. 2, 2023

(30) Foreign Application Priority Data
Aug. 27, 2021 (JP) .................. 2021-139016

(51) Int. Cl.
*B81C 99/00* (2010.01)
*B06B 1/02* (2006.01)
*B81B 3/00* (2006.01)

(52) U.S. Cl.
CPC ............ *B81C 99/0085* (2013.01); *B06B 1/02* (2013.01); *B81B 3/0021* (2013.01); *B81B 2201/03* (2013.01); *B81C 2201/034* (2013.01)

(58) Field of Classification Search
CPC .......... B81C 99/0085; B81C 2201/034; B81C 1/00158; B06B 1/02; B06B 1/0688; B81B 3/0021; B81B 2201/03; B81B 2201/0242
See application file for complete search history.

(56) References Cited

U.S. PATENT DOCUMENTS 9,796,586 B2 10/2017 Najafi et al.
2015/0329402 A1 11/2015 Afzal et al.
(Continued)

FOREIGN PATENT DOCUMENTS

JP 2012-121799 A 6/2012
KR 102187114 B1 12/2020

*Primary Examiner* — Steven B Gauthier
*Assistant Examiner* — Sun Mi Kim King
(74) *Attorney, Agent, or Firm* — Posz Law Group, PLC

(57) ABSTRACT

In a method for manufacturing a micro vibration body having a three-dimensional curved surface, a mold defining a recess part is prepared, and a plate-shaped reflow material is arranged on the mold so as to cover the recess part. Pressure of a space defined by the recess part covered with the reflow material is reduced, and the reflow material is deformed by heating from an upper surface side opposite to a lower surface facing the recess part and by means of the pressure reduced. When the reflow material is deformed, a part of the mold is heated and/or cooled. As another example, when the reflow material is deformed, a mold having a different heat capacity portion is used to generate a temperature gradient in the mold.

8 Claims, 8 Drawing Sheets

(56) References Cited

U.S. PATENT DOCUMENTS

| | | |
|---|---|---|
| 2016/0194200 A1 | 7/2016 | Najafi et al. |
| 2018/0079129 A1 | 3/2018 | Najafi et al. |
| 2019/0094024 A1* | 3/2019 | Najafi ................ G01C 19/5691 |
| 2022/0411312 A1 | 12/2022 | Hoing et al. |

* cited by examiner

MICRO VIBRATION BODY HAVING THREE-DIMENSIONAL CURVED SURFACE SHAPE AND METHOD FOR MANUFACTURING THE SAME

CROSS REFERENCE TO RELATED APPLICATION

The present application claims the benefit of priority from Japanese Patent Application No. 2021-139016 filed on Aug. 27, 2021. The entire disclosures of the above application are incorporated herein by reference.

TECHNICAL FIELD

The present disclosure relates to a micro vibration body having a three-dimensional curved surface shape and a method for manufacturing the same.

BACKGROUND

In recent years, the development of a micro vibration body having a three-dimensional curved surface and being capable of vibrating in a wine glass mode, and the development of a micro-electrochemical systems (MEMS) sensor equipped with the micro vibration body have been promoted. Examples of this type of MEMS sensor may include rate integrating gyroscope (RIG) and bird-bath resonator gyroscope (BRG).

SUMMARY

The present disclosure describes a micro vibration body having a three-dimensional curved surface shape and a method for manufacturing the micro vibration body.

BRIEF DESCRIPTION OF THE DRAWINGS

Objects, features and advantages of the present disclosure will become more apparent from the following detailed description made with reference to the accompanying drawings, in which like parts are designated by like reference numbers and in which.

DETAILED DESCRIPTION

Figure 1:
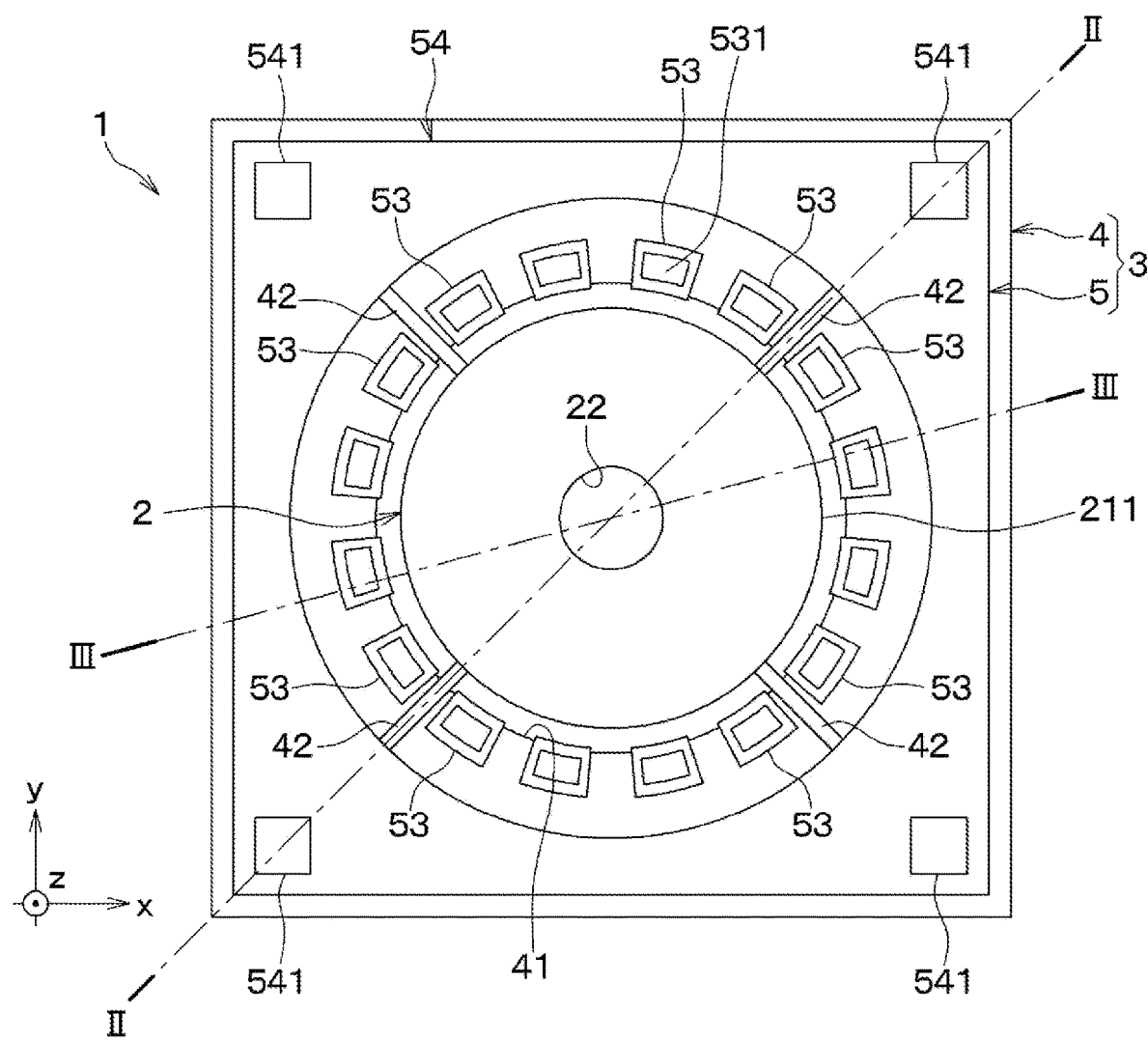
FIG. 1 is a top view showing an example of a device having a micro vibration body according to a first embodiment.

To begin with, a relevant technology will be described only for understanding the embodiments of the present disclosure.

To form a micro vibration body, a mold having a recess part may be prepared, a plate-shaped reflow material may be set in the mold, and the reflow material may be heated and softened. When pressure in the recess part is reduced, a softened portion of the reflow material is deformed, and hence the three-dimensional curved surface shape may be formed. Such a micro vibration body may have a quality factor (Q) of $10^6$ or more, as the factor representing a vibration state. Such a micro vibration body is expected to have a higher sensitivity.

For example, the three-dimensional curved surface shape of such a micro vibration body may be formed by heating a reflow material on one side by a heat source such as a blow-torch so as to soften the reflow material, and by controlling a pressure gradient through the mold. In a case where the micro vibration body is formed by deforming the softened reflow material along the recess part of the mold but hardly contacting the surface of the recess part of the mold, the micro vibration body has an excellent surface smoothness.

In such a micro vibration body, it is expected to control the shape or thickness distribution of the three-dimensional curved surface portion in order to further improve the quality factor, robustness, impact resistance and vibration characteristics, in addition to the surface smoothness described above.

In the method described above, however, it is difficult to control a temperature distribution of the reflow material during the formation of the three-dimensional shape, and thus difficult to control the shape or thickness distribution of the three-dimensional shaped surface portion to an optimum shape or thickness distribution.

The present disclosure provides a micro vibration body having a three-dimensional curved surface shape with excellent surface smoothness and controlled shape or thickness distribution, and a method for manufacturing the same.

According to an aspect of the present disclosure, a method for manufacturing a micro vibration body having a three-dimensional curved surface includes: preparing a mold defining a recess part; arranging a plate-shaped reflow material on the mold so as to cover the recess part; reducing pressure of a space defined by the recess part covered with the reflow material; and deforming the reflow material by heating the reflow material from an upper surface side of the reflow material opposite to a lower surface facing the recess part to soften the reflow material and by means of the pressure reduced. The deforming of the reflow material includes at least one of heating a part of the mold or cooling a part of the mold.

In such a method, the reflow material is arranged on the mold having the recess part, and is softened by heating. Further, the reflow material is deformed due to the reduced pressure of the space of the recess part, and a part of the mold is heated and/or cooled. By heating and/or cooling the part of the mold at the time of molding the reflow material, it is possible to control the temperature distribution in the reflow material. As such, it is possible to control the shape or thickness distribution of the three-dimensional curved surface. In this case, since the reflow material hardly contacts with a surface of the recess part of the mold, it is possible to produce the micro vibration body in which the shape or thickness distribution of the three-dimensional curved surface portion is controlled while ensuring the surface smoothness.

According to an aspect of the present disclosure, a method for manufacturing a micro vibration body having a three-dimensional curved surface includes: preparing a mold defining a recess part; arranging a plate-shaped reflow material on the mold so as to cover the recess part; reducing pressure of a space defined by the recess part covered with the reflow material; and deforming the reflow material by heating the reflow material from an upper surface side opposite to a second surface facing the recess part to soften the reflow material and by means of the pressure reduced. The deforming of the reflow material includes using the mold that includes a different heat capacity portion that is made of a material having a heat capacity different from another part of the mold so as to generate a temperature gradient in the mold.

In such a method, the reflow material is arranged on the mold having the recess part, and is softened by heating. Further, the reflow material is deformed due to the reduced pressure of the space of the recess part. As the mold, the mold having the different heat capacity portion that is made of a material having the different heat capacity from another part is prepared. In the deforming of the reflow material, the temperature gradient is generated within the mold. As such, it is possible to control the temperature distribution in the reflow material, and thus the shape or thickness distribution of the three-dimensional curved surface is controlled.

Accordingly, it is possible to produce the micro vibration body ensuring the surface smoothness due to the reflow material hardly contacting with the surface of the recess part of the mold during the deforming, and in which the shape or thickness distribution of the three-dimensional curved surface is controlled.

According to an aspect of the present disclosure, a micro vibration body is made of a reflow material that is capable of being softened by heat. The micro vibration body includes a curved surface portion defining an annular curved surface. The curved surface portion includes a front surface, which is a surface on a side having a larger outer diameter, and a back surface opposite to the front surface. The front surface is a smooth surface. The curved surface portion has a thickness satisfying a relation of t2/t1≥0.4, in which t1 represents a thickness of a thickest portion in the curved surface portion, and t2 represents a thickness of a thinnest portion in the curved surface portion.

In such a configuration, in the curved surface portion made of the reflow material and having the annular curved surface with a smooth surface, a ratio of the thickness t2 of the thinnest portion to the thickness t1 of the thickest portion is 0.4 or more. As such, the thickness uniformity of the micro vibration body is improved. Since the micro vibration body has the surface smoothness and the thickness distribution being closer to uniform, as compared with a micro vibration body produced by the relevant technology, the quality factor, robustness, impact resistance, vibration characteristics, and the like are enhanced.

Hereinafter, embodiments of the present disclosure will be described with reference to the drawings. In the following descriptions, the same or equivalent parts are designated with the same reference numerals throughout the embodiments.

First Embodiment

A first embodiment will be described with reference to the drawings. A micro vibration body 2 according to the present embodiment is a thin film member having, for example, a substantially hemispherical three-dimensional curved surface portion and being capable of vibrating in a wine glass mode. The micro vibration body 2 can be used in various MEMS devices utilizing vibration characteristics such as a gyro sensor. Hereinafter, a case where the micro vibration body 2 according to the present embodiment is used for an inertial sensor 1 will be described as a typical example. However, the structure and application of the micro vibration body 2 are not limited.

<Inertial Sensor>

An example of the inertial sensor 1 having the micro vibration body 2 will be briefly described with reference to FIGS. 1 to 3.

Hereinafter, for convenience of explanation, a direction along a left and right direction in FIG. 1 is referred to as an "x direction", a direction orthogonal to the x direction and along an up and down direction in FIG. 1 is referred to as a "y direction", and a direction normal to the x-y plane is referred to as a "z direction". The x, y, and z directions in FIG. 2 and subsequent figures correspond to the x, y, and z directions in FIG. 1, respectively. Further, in the present specification, "up" or "upper" represents a direction along the z direction in the view and represents a direction along the arrow, and "down" or "lower" represents the opposite direction to the "up" or "upper". In the present specification, for example, as shown in FIG. 1, a state in which the inertial sensor 1 is viewed from the upper side in the z direction may be referred to as a "top view".

As shown in FIG. 1, for example, the inertial sensor 1 has a micro vibration body 2 and a mounting substrate 3, and the micro vibration body 2 is joined to the mounting substrate 3. For example, the inertial sensor 1 is a gyro sensor, and is configured to detect an angular velocity applied to the inertial sensor 1 based on a change in capacitance between a thin-walled micro vibration body 2 and a plurality of electrode portions 53 on the mounting substrate 3, which will be described later in detail.

Figure 2:
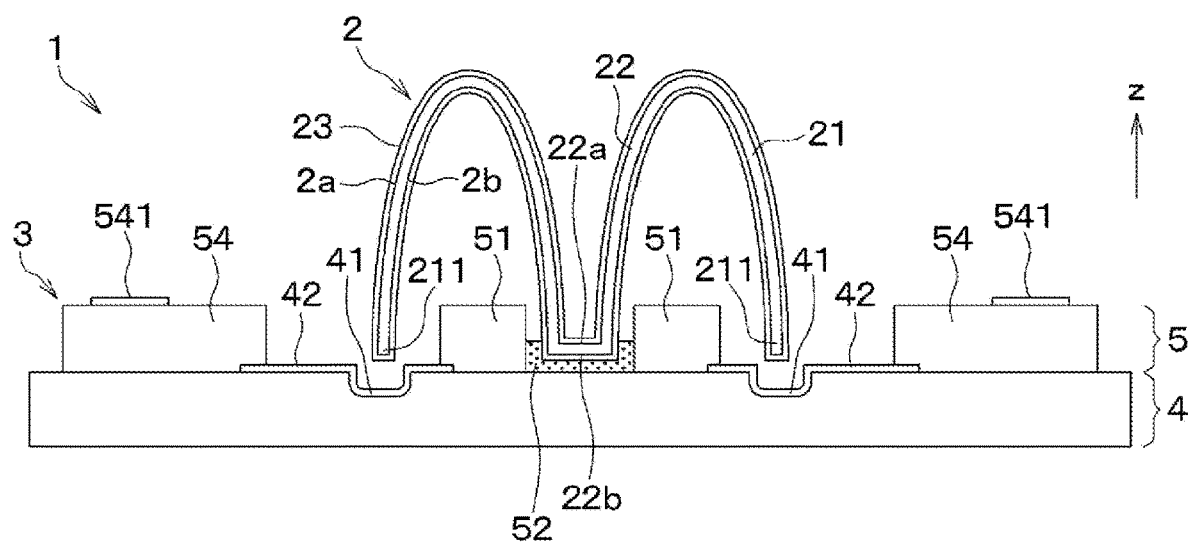
FIG. 2 is a cross-sectional view of the device taken along a line II-II in FIG. 1.

As shown in FIGS. 1 and 2, for example, the micro vibration body 2 includes a curved surface portion 21 and a recess portion 22. The curved surface portion 21 has a three-dimensional curved surface defining a substantially hemispherical three-dimensional outer shape. The recess portion 22 is defined by a recess from the apex portion of the generally hemispherical curved surface portion 21 toward the center of a virtual hemisphere that defines an outer surface of the curved surface portion 21. In the micro vibration body 2, for example, the curved surface portion 21 has a bowl-shaped three-dimensional curved surface. The micro vibration body 2 has the quality factor of vibration of $10^6$ or more. The micro vibration body 2 has a rim 211 at an end opposite to the recess portion 22. The rim 221 has, for example, a substantially cylindrical shape. The micro vibration body 2 is mounted on the mounting substrate 3 so that a front surface 2a of the rim 211 faces the electrode portions 53 on the mounting substrate 3, which will be described later, and the electrode portions 53 are evenly spaced therebetween. As shown in FIGS. 2 and 3, for example, the micro vibration body 2 is in a hollow state in which the curved surface portion 21 including the rim 211 does not come into contact with other elements, and is in a state where it can vibrate in the wine glass mode.

Figure 3:
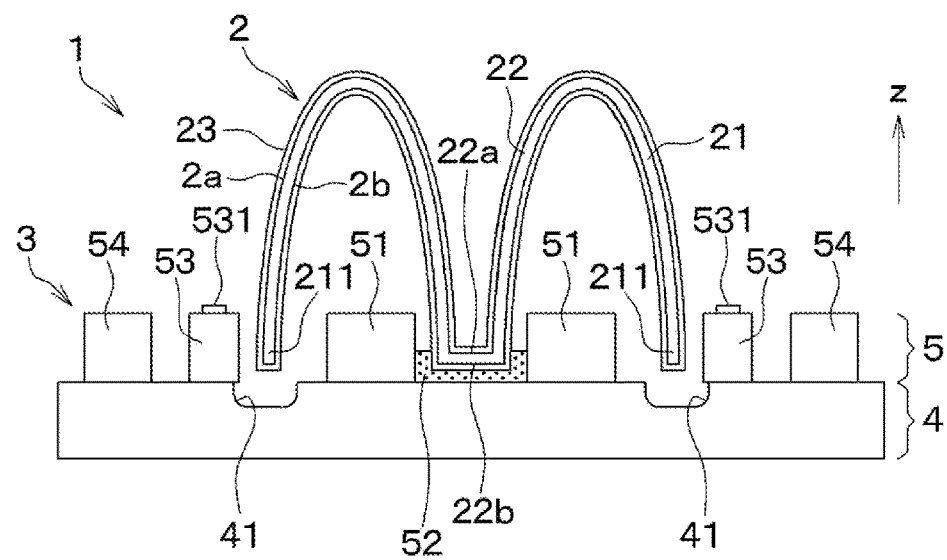
FIG. 3 is a cross-sectional view of the device taken along a line III-III in FIG. 1.

For example, as shown in FIG. 3, the micro vibration body 2 has the front surface 2a and a back surface 2b opposite to the front surface 2a. The front surface 2a has a larger outer diameter than the back surface 2b. A bottom surface of the recess portion 22, which is on the side of the back surface 2b in the Z direction, is a mounted surface 22b joined to the mounting substrate 3. For example, a bottom surface of the recess portion 22 of the micro vibration body 2 on the side of the front surface 2a in the Z direction serves as a suction surface 22a, which is used for conveying the micro vibration body 2 when the micro vibration body 2 is mounted on the mounting substrate 3. When the micro vibration body 2 is mounted on the mounting substrate 3, the curved surface portion 21 including the rim 211 is in a hollow state so as not to come into contact with other elements and is configured such that the hollow rim 211 vibrates in the wine glass mode. A conductive layer 23 is formed on the front surface 2a and the back surface 2b of the micro vibration body 2A. The conductive layer 23 is formed of, for example, but not limited to, a laminated film of a conductive material such as chromium (Cr) or titanium (Ti) and gold (Au) or platinum (Pt) from the side of the base material. The conductive layer 23 serves as an electrode film. The conductive layer 23 is formed on the front surface 2a and the back surface 2b of the micro vibration body 2 by an appropriate vacuum film forming method such as sputtering or thin film deposition.

The micro vibration body 2 is made of, for example, a reflow material that is softened by heating, such as quartz, glass, or silicon (Si). The micro vibration body 2 is, for example, a micrometer-order thin member having a thickness of 100 micrometers ($\mu$m) or less. The micro vibration body 2 is formed by processing a plate-shaped reflow material into a three-dimensional curved surface shape. The micro vibration body 2 has a shape in a millimeter-size such that a dimension in a height direction along a thickness direction of the mounting substrate 3 is 2.5 mm, and an outer diameter of the front surface 2a of the rim 211 is 5 mm, for example. Further, the micro vibration body 2 is formed by using the reflow material, and the front surface 2a of the curved surface portion 21 that does not contact a mold, which will be described later, is smooth. For example, the surface roughness Ra of the surface 2a is 1 nm or less. A method for manufacturing the micro vibration body 2 will be described later.

As shown in FIG. 1, for example, the mounting substrate 3 includes a lower substrate 4 and an upper substrate 5, which are joined to each other. For example, the upper substrate 5 is made of Si, which is a semiconductor material, and the lower substrate 4 is made of borosilicate glass, which is an insulating material. The mounting substrate 3 is obtained by anode-bonding the upper substrate 5 to the lower substrate 4.

The lower substrate 4 includes, for example, an annular etched groove 41 and a bridge wiring 42 arranged so as to straddle the etched groove 41. The bridge wiring 42 is made of a conductive material such as aluminum (Al). The etched groove 41 is formed by, for example, wet etching using buffered hydrofluoric acid. The bridge wiring 42 is formed, for example, by a lift-off method using a film formation by sputtering Al. The bridge wiring 42 is arranged to pass between the electrode portions 53, and is electrically independent of the electrode portions 53. As shown in FIG. 2, for example, one end of the bridge wiring 42 is covered with an outer frame portion 54, and the other end of the bridge wiring 42 is covered with an inner frame portion 51. The bridge wiring 42 has a function of electrically connecting the outer frame portion 54 and the inner frame portion 51 to have the same potential.

The upper substrate 5 includes the inner frame portion 51, the plurality of electrode portions 53 and the outer frame portion 54. The inner frame portion 51 has a frame shape. The electrode portions 53 are spaced from each other, while surrounding the inner frame portion 51. The outer frame portion 54 has a frame shape and is disposed to surround the electrode portions 53. A region of the mounting substrate 3 surrounded by the inner frame portion 51 is a joining region to which the micro vibration body 2 is joined, and a joining member 52 is arranged in the region. The joining member 52 is a conductive material containing an electrically conductive material such as gold tin (AuSn), silver (Ag), and Au. The upper substrate 5 is, for example, a Si substrate. After the upper substrate 5 is anode-bonded to the lower substrate 4 having the etched groove 41 and the bridge wiring 42, the upper substrate 5 is subjected to a trench etching such as deep reactive ion etching (DRIE) so as to be sectioned into respective regions, that is, the inner frame portion 51, the electrode portions 53, and the outer frame portion 54.

The inner frame portion 51 has, for example, an annular shape when viewed from the top. As shown in FIGS. 2 and 3, for example, the inner frame portion 51 has dimensions such that its outer diameter and its inner diameter do not come into contact with the micro vibration body 2.

The electrode portions 53 are arranged apart from each other so as to surround the inner frame portion 51 at the position on the radially outer side of the etched groove 41. For example, as shown in FIG. 1, the electrode portions 53 have a configuration that is provided by evenly dividing a ring surrounding the inner frame portion 51 at predetermined intervals, when viewed from the top. As shown in FIG. 3, for example, an electrode film 531 is formed on the upper surface of each of the electrode portions 53, and a wire (not shown) is connected to the electrode film 531. As a result, the electrode portions 53 are electrically connected to an external circuit board or the like (not shown), and the potential thereof can be controlled. As shown in FIGS. 1 and 3, for example, when the micro vibration body 2 is mounted on the mounting substrate 3, the electrode portions 53 are in a state of being separated from the rim 211 of the micro vibration body 2 by a predetermined distance, and each of the electrode portions 53 forms a capacitor with the micro vibration body 2. That is, the mounting substrate 3 is configured to detect the capacitance with the micro vibration body 2 via the electrode portions 53 and to generate an electrostatic attractive force with the micro vibration body 2 to enable the micro vibration body 2 to vibrate in the wine glass mode.

The outer frame portion 54 has a single frame shape surrounding the inner frame portion 51 in the top view. The outer frame portion 54 is provided with electrode films 541, which are formed of Al or the like, on the upper surface, for example, as shown in FIG. 2. The outer frame portion 54 is electrically connected to the external circuit board or the like (not shown) via wires (not shown) connected to the electrode films 541. Thus, the potential of the outer frame portion 54 can be controlled by an external power source (not shown) or the like. The outer frame portion 54 is electrically connected to the micro vibration body 2 via the bridge wiring 42, the inner frame portion 51, and the joining member 52. In other words, the mounting substrate 3 is configured so that the potential of the micro vibration body 2 can be adjusted by adjusting the potential of the outer frame portion 54.

The configuration, shape, and the like of the micro vibration body 2 and the mounting substrate 3 are not limited to the examples shown in FIGS. 1 to 3, and may be modified as appropriate. A cap member (not shown) is attached to the mounting substrate 3 not to be in contact with the micro vibration body 2, for example, in a vacuum environment where the vacuum level is a predetermined level or less value, so that the micro vibration body 2 is vacuum-tightly sealed.

The inertial sensor 1 has the configurations described above as basic configurations.

<Method for Manufacturing Micro Vibration Body>

Next, a method for manufacturing the micro vibration body 2 of the present embodiment will be described with reference to FIGS. 4A to 4D.

Figure 4A:
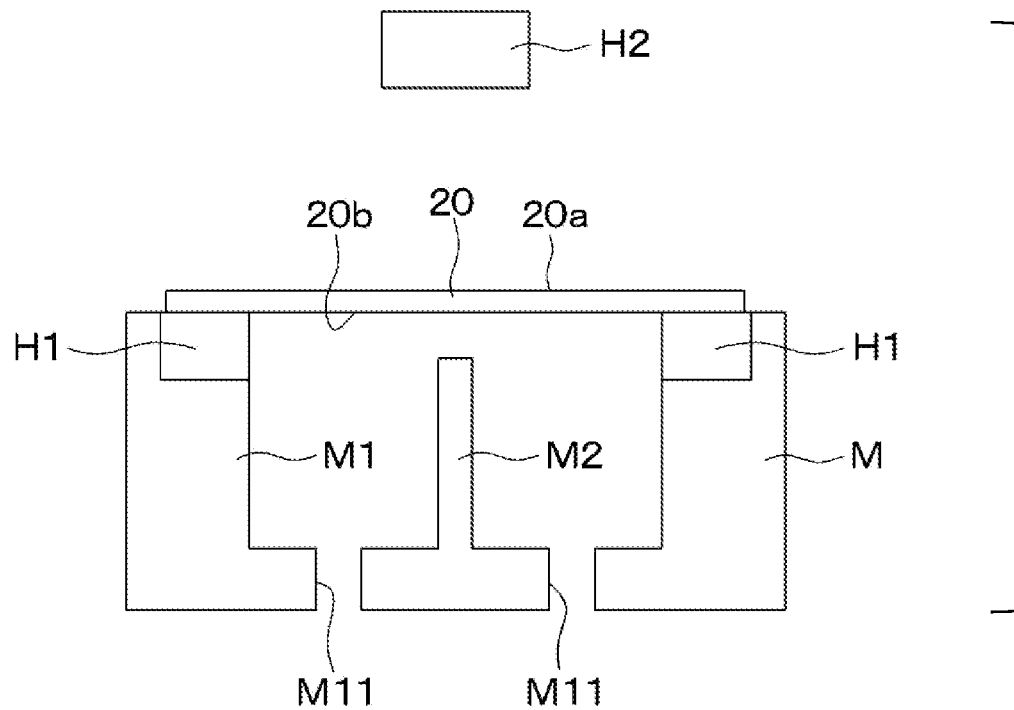
FIG. 4A is a diagram showing a preparation process in a manufacturing process of the micro vibration body according to the first embodiment.

First, a plate-shaped reflow material 20 and a mold M for forming a three-dimensional curved surface shape are prepared, for example, as shown in FIG. 4A. Examples of the plate-shaped reflow material 20 include a quartz plate. The reflow material 20 is arranged so as to cover the entire area of a recess part M1 of the mold M, which will be described later.

The mold M is, for example, a mold made of any material or composite material having higher heat resistance than the reflow material 20. The mold M has, for example, the recess part M1 that provides a space for forming the three-dimensional curved surface shape in the reflow material 20. The mold M has, for example, a columnar support portion M2 that protrudes toward the upper end of the recess part M1 along the depth direction of the recess part M1 at the center of the recess part M1 to support a part of the reflow material 20 during processing. The mold M has a through hole M11 on the bottom surface of the recess part M1 and can be attached to a vacuum mechanism (not shown) to reduce the pressure in the space of the recess part M1 closed with the reflow material 20 through the through hole M11. Further, the mold M has a built-in first heating source H1 that can heat a part of the mold M at the time of softening/molding of the reflow material 20 by an external second heating source H2, which will be described later. The first heating source H1 is, for example, an electric heater, a Peltier element, or the like. The first heating source H1 is arranged at the upper end of the recess part M1 in the mold M and at a position where the first heating source H1 comes into contact with the reflow material 20.

The "upper end of the recess part M1" mentioned above means the end of the inner wall of the recess part M1 on a side opposite to the through hole M11. Hereinafter, for convenience of explanation, of outer surfaces of the reflow material 20, the surface opposite to the recess part M1 is referred to as the "upper surface 20a", and the surface facing the recess part M1 is referred to as the "lower surface 20b".

Figure 4B:
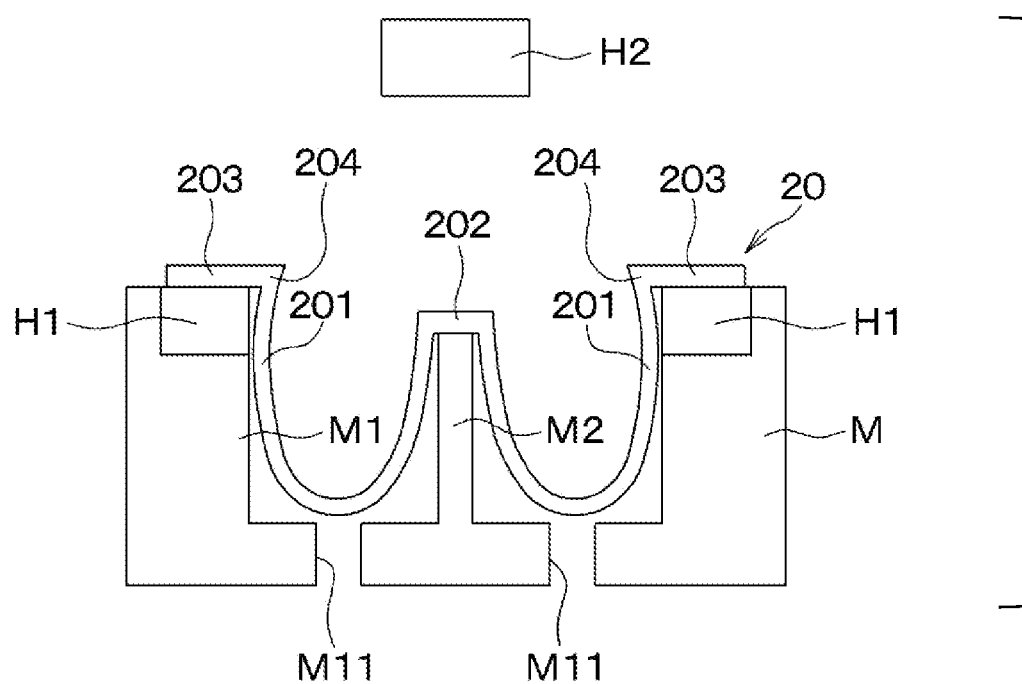
FIG. 4B is a diagram showing a manufacturing process following FIG. 4A.

A second heating source H2 is provided above the upper surface 20a of the reflow material 20, and the reflow material 20 is heated and softened by the second heating source H2. For example, as shown in FIG. 4B, the reflow material 20 is heated and softened by the second heating source H2. The second heating source H2 is, for example, a flame by a torch, but is not limited to this example. The second heating source H2 may employ any heating method, such as radiation, heat transfer, convection, or induction heating as long as the second heating source H2 can heat and soften the reflow material 20. In a case where the reflow material 20 is a quartz plate, for example, the reflow material 20 is heated to a temperature of 1600 degrees Celsius (° C.) to 1800° C. by the second heating source H2. The heating temperature is appropriately changed according to the softening point, thickness, dimensions, or the like of the reflow material 20.

When the reflow material 20 is heated and softened, a space defined by the recess part M1 of the mold M and the reflow material 20 is evacuated through a through hole M11 by using a vacuum mechanism (not shown). For example, the evacuation is performed so as to bring the degree of vacuum in the recess part M1 to be about 0.25 atm (about 253 hPa). However, the conditions for this evacuation are appropriately changed according to the final shape and the like of the micro vibration body 2 to be formed. As a result, the softened portion of the reflow material 20 is in a state where the lower surface 20b side is stretched toward the bottom surface of the recess part M1 and the peripheral region of the central part thereof is supported by the support column portion M2. As such, the reflow material 20 is formed with the curved surface portion 201 having a substantially hemispherical three-dimensional curved surface shape and the recessed portion 202 in the vicinity of the center of the curved surface portion 201 by being supported by the support column portion M2. Further, a portion of the reflow material 20 located outside the recess part M1 is formed as the end portion 203 that is located at an outer peripheral end of the curved surface portion 201. The end portion 203 has a flat shape.

At this time, the first heating source H1 of the mold M is operated to heat a part of the mold M, such as a part in contact with the reflow material 20, so as to generate a temperature gradient in the mold M. The heating by the first heating source H1 is to control the temperature distribution of the reflow material 20 during molding, thereby to control the thickness and shape of the curved surface portion 201 and the recessed portion 202.

When the first heating source H1 is not operated, in the reflow material 20, a boundary portion between the curved surface portion 201 and the end portion 203 protrudes toward the center of the recess part M1 and becomes an overhang portion 204, for example, as shown in FIG. 4B. This is because the temperature of a portion of the reflow material 20 that abuts on the mold M and the temperature of a portion of the reflow material 20 adjacent to the abutting portion are lower than that of a suspended portion of the reflow material 20 away from the mold M, and the fluidity of the potions having the lower temperature is lower than that of the portion having the higher temperature.

In the heat molding described above, the portion of the reflow material 20 that does not come into contact with the mold M, that is, the curved surface portion 201 has excellent surface smoothness (for example, the surface roughness Ra is 1 nm or less). However, the shape of the inner wall or the bottom surface of the recess part M1 of the mold M cannot be reflected on the reflow material 20. As a result of diligent studies by the inventors of the present disclosure, it has been found that the shape and thickness of the curved surface portion 201 of the reflow material 20 can be controlled by controlling the temperature distribution of the reflow material 20 during the heat molding of the reflow material 20. Of the reflow material 20, the portion having a higher temperature tended to be relatively thin, and the portion having a lower temperature tended to be relatively thick. Further, the inventors of the present disclosure have found that the temperature control of the mold M is effective at the time of heat molding, as a method of controlling the temperature distribution at the time of heat molding of the reflow material 20.

Figure 4C:
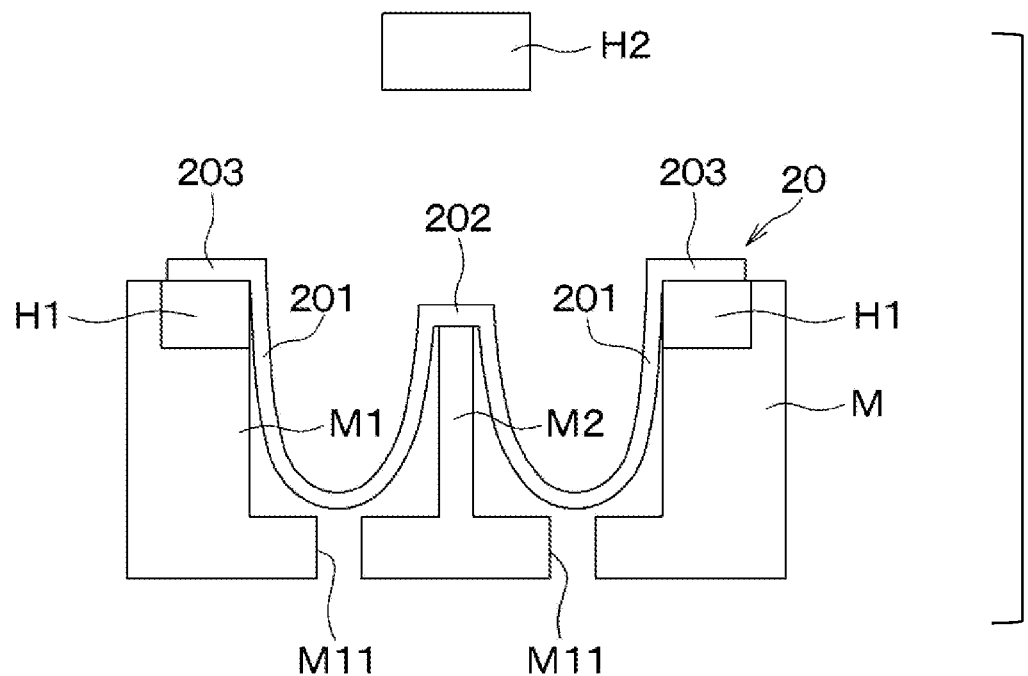
FIG. 4C is a diagram showing a manufacturing process following FIG. 4B.

Specifically, the mold M having the first heating source H1 therein is used. At the time of heat molding of the reflow material 20, a part of the mold M is heated by the first heating source H1 so as to generate the temperature gradient in the mold M. More specifically, the part of the mold M is heated by the first heating source H1, which is arranged in a region contacting with the reflow material 20 at the upper end of the recess part M1 of the mold M, for example, as shown in FIG. 4C. As a result, the reflow material 20 has a shape without the overhang portion 204, because the temperature drop of the portion located at the boundary between the curved surface portion 201 and the end portion 203 is suppressed.

In the case where the first heating source H1 is a heater and the reflow material 20 is a quartz plate, the heating by the first heating source H1 is performed so that the first heating source H1 has the temperature in a range 1600° C. to 1800° C. However, the heating temperature of the first heating source H1 can be appropriately changed depending on the thickness, material, and the like of the reflow material 20. In the above description, for convenience of explanation, an example in which the first heating source H1 is operated during the heat molding of the reflow material 20 to heat a part of the mold M has been described. However, the heating is not limited to such an example. For example, the first heating source H1 may be operated simultaneously with or prior to the second heating source H2, before the overhang portion 204 shown in FIG. 4B occurs.

Figure 4D:
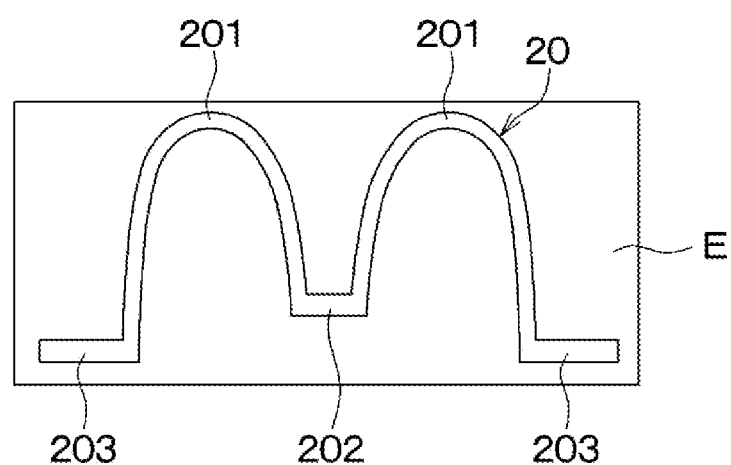
FIG. 4D is a diagram showing a manufacturing process following FIG. 4C.

Next, the pressure of the recess part M1 of the mold M is returned to normal pressure, and the reflow material 20 after processing is removed. Then, the reflow material 20 is sealed with a sealing material E made of an arbitrary curable resin material, for example, as shown in FIG. 4D. Thereafter, the sealing material E is polished and is subjected to a chemical mechanical polishing (CMP) from the surface adjacent to the end portion 203 so as to remove the end portion 203 together with the sealing material E. As a result, the reflow material 20 has the configuration having the curved surface portion 21 of an annular curved surface and the recess portion 22 recessed from the curved surface portion 21.

Then, all the sealing material E is removed, and the reflow material 20 is taken out. In this case, the sealing material E may be removed by any method such as heating or dissolution using a chemical solution. Finally, the conductive layer 23 is formed on the front surface and the back surface of the processed reflow material 20 as described above. The conductive layer 23 may be formed by any film-formation process, such as sputtering, vapor deposition, atomic layer deposition (ALD) or chemical vapor deposition (CVD).

The micro-vibrating body 2 is produced by the manufacturing process as described above, and has, for example, a substantially half-toroidal shape that is rotationally symmetric with the Z direction as the axis of rotation. However, the shape of the micro vibration body 2 is not limited to the shape indicated as above, as long as the micro vibration body 2 can vibrate in a wine glass mode. The gyro sensor in which the minute vibrating body 2 having the illustrated shape is mounted on the mounting substrate 3 is also referred to as the bird-bath resonator gyroscope (BRG).

According to the present embodiment, the reflow material 20 is placed on the mold M having the recess part M1, and the reflow material 20 is heated and softened. Further, the space of the recess part M1 is reduced in pressure. Thus, since the reflow material 20 is deformed without coming into contact with the inner wall or the bottom surface of the recess part M1, the surface smoothness of the curved surface portion 201 can be ensured. Further, since the part of the mold M is heated by the first heating source H1, it is possible to control the temperature distribution in the reflow material 20 during the heating and molding the reflow material 20. As such, it is possible to control the shape or the thickness distribution of the three-dimensional curved surface. As a result, it is possible to obtain the micro vibration body 2 having the surface smoothness and in which the shape or the thickness distribution of the three-dimensional curved surface portion is controlled.

The temperature variation of the reflow material 20 in the molding process is smaller than that in a comparative method in which the part of the mold M is not heated. As a result, the micro vibration body 2 of the present embodiment has the configuration in which the variation in thickness is suppressed. In the comparative example, for example, when the thickness of the thinnest portion of the curved surface portion 201 is about 10 µm, the thickness of the thickest portion is about 100 µm. On the other hand, by the manufacturing method of the present embodiment, the micro vibration body 2 in which the thicknesses of the thickest portion and the thinnest portion are respectively in a range approximately 20 to 50 µm is obtained. For example, in the micro vibration body 2, the thickness of the thickest portion of the curved surface portion 21 is defined as t1, and the thickness of the thinnest portion of the curved surface portion 21 is defined as t2. In the micro vibration body 2, by the heating of the part of the mold M, the largest thickness t1 is 100 µm or less, and the ratio of the smallest thickness t2 to the largest thickness t1 is 0.4 or more (t2/t1≥0.4). That is, the thickness of the micro vibration body 2 of the present embodiment is more uniform than the comparative example. The micro vibration body 2, whose thickness distribution is controlled as described above, can be controlled so as to have a resonance frequency at a desired value, as well as have the thickness closer to uniform than that of the comparative example. Thus, the micro vibration body 2 achieves improved impact resistance, vibration resistance, and robustness.

Second Embodiment

A second embodiment will be described with reference to FIGS. 5A to 5D.

A micro vibration body 2 of the present embodiment is formed by a process that includes at least one of heating a part of a mold M by the first heating source H1 provided in the mold M or cooling a part of the mold M by a cooling source C1 provided in the mold M, for example, as shown in FIGS. 5A to 5D. The micro vibration body 2 of the present embodiment is not formed with the recess portion 22. The micro vibration body 2 of the present embodiment is different from the first embodiment in the points described above. Hereinafter, the difference from the first embodiment will be mainly described.

Figure 5A:
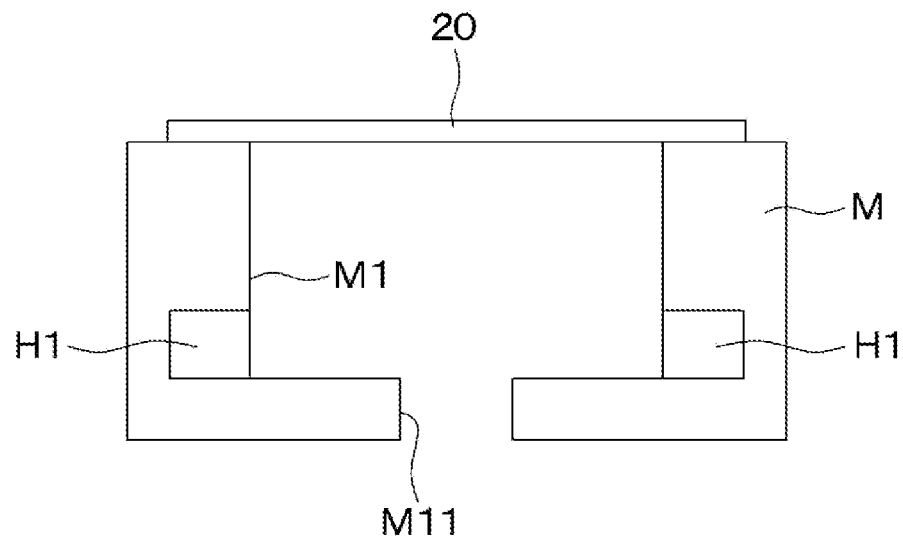
FIG. 5A is a diagram showing a preparation process in a manufacturing process of a micro vibration body according to a second embodiment.
Figure 5B:
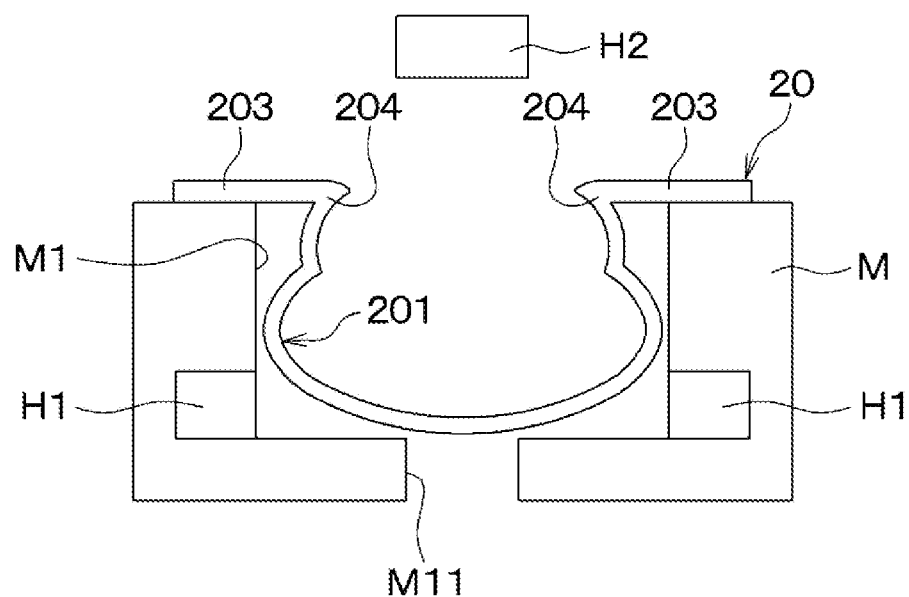
FIG. 5B is a diagram showing an example of a manufacturing process following FIG. 5A, in which a part of a mold is heated.
Figure 5C:
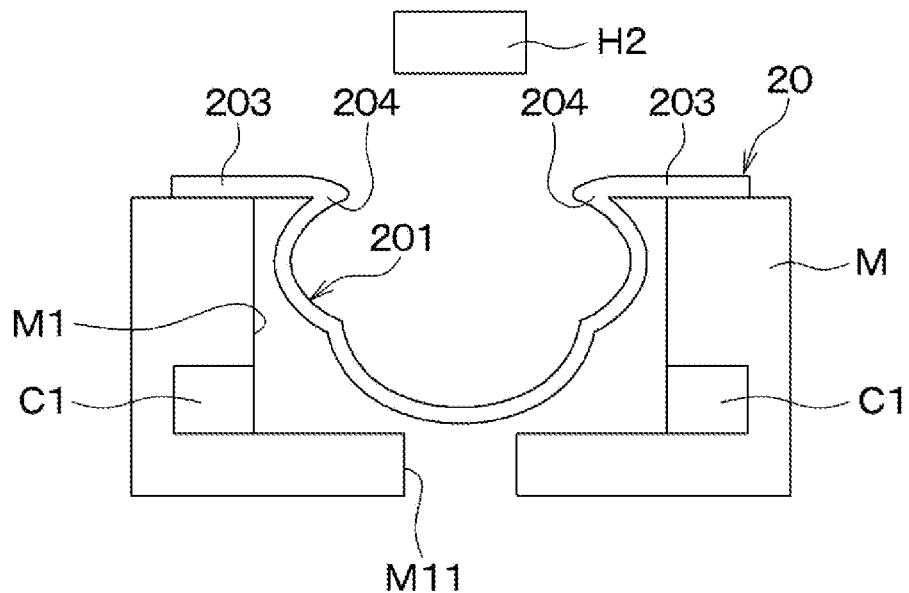
FIG. 5C is a diagram showing an example of a manufacturing process following FIG. 5A, in which a part of the mold is cooled.

In the present embodiment, the mold M for producing the micro vibration body 2 does not have the support column portion M2. The mold M has the first heating source H1 therein adjacent to the bottom surface of the recess part M1, for example, as shown in FIG. 5A. That is, the mold M can heat a part of the mold M that does not come into contact with the reflow material 20 at the time of heat molding of the reflow material 20, and does not support the softened part of the reflow material 20. In this case, the reflow material 20 is formed to have the overhang portion 204, for example, as shown in FIG. 5B. Further, the reflow material 20 is formed to have a "bottom bulge" so that a portion of the curved surface portion 201 adjacent to the first heating source H1 is more expanded than a portion adjacent to the upper end of the recess part M1. It is considered that such a shape is produced because the temperature of the portion of the reflow material 20 near the first heating source H1 is less likely to decrease, and the fluidity during heat molding is ensured. In a case where the reflow material 20 is a quartz plate, such a shape of the reflow material 20 is produced by heating the reflow material 20 to about 1600° C. by the second heating source H2 while controlling the temperature of the first heating source H1 to about 800° C. Then, by removing the end portion 203 by the CMP or the like similarly to the first embodiment, the micro vibration body 2 has the shape in which the curved surface portion 21 is provided by the curved surface portion 201 including the bottom bulge, and does not have a portion corresponding to the recess portion 22.

As another example, as shown in FIG. 5B, the mold M may have a cooling source C1 built therein, in place of the first heating source H1. The cooling source C1 is, for example, provided by a Peltier element or a cooling mechanism having a cooling pipe (not shown) capable of flowing a refrigerant such as water therein. In this case, the reflow material 20 is formed to have an overhang portion 204, and has a "bottom narrowed" shape in the curved surface portion 201 so that a portion of the curved surface portion 201 adjacent to the cooling source C1 is narrower than the portion adjacent to the upper end of the recess part M1. It is considered that such a shape is produced because the temperature of the portion of the reflow material 20 adjacent to the cooling source C1 is further lowered, and the fluidity during heat molding is suppressed. In a case where the reflow material 20 is a quartz plate, for example, such a shape of the reflow material 20 is produced by heating the reflow material 20 to about 1600° C. by the second heating source H2, while controlling the temperature of the cooling source C1 to about 100° C.

Figure 5D:
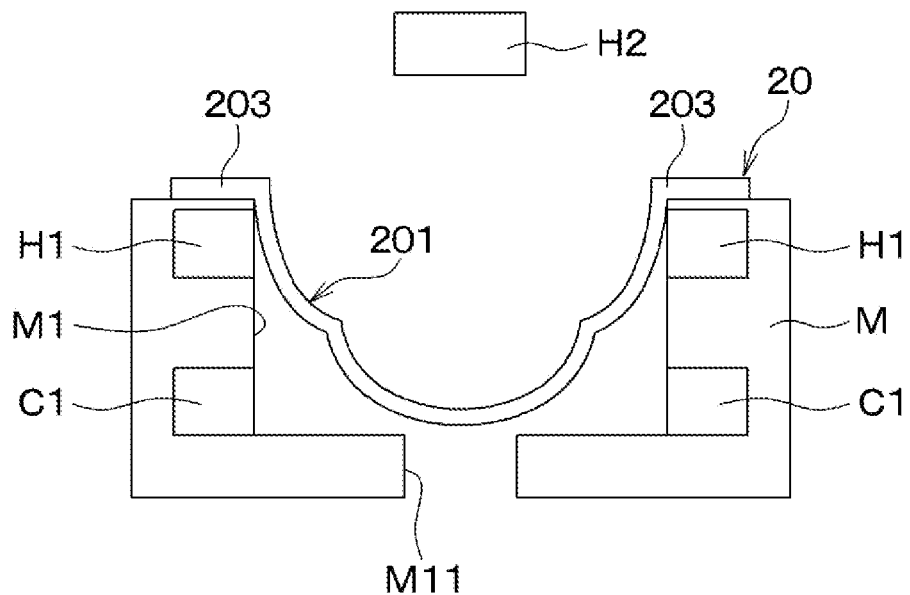
FIG. 5D is a diagram showing an example of a manufacturing process following FIG. 5A, in which a part of the mold is heated and another part of the mold is cooled.

As another example, as shown in FIG. 5D, the mold M may have both the first heating source H1 and the cooling source C1 therein. The mold M can heat a part of the mold M, while cooling a part different from the heated part. In the mold M, for example, the first heating source H1 is arranged adjacent to the upper end of the inner wall of the recess part M1 and the cooling source C1 is arranged adjacent to the bottom surface. In this case, in the reflow material 20, the formation of the overhang portion 204 is suppressed by the heating of the first heating source H1, and the portion of the curved surface portion 201 near the cooling source C1 is deflated or narrowed from the other portions. It is considered that such a shape is produced because the fluidity of the portion of the reflow material 20 near the first heating source H1 is ensured during heat molding, while the fluidity of the portion near the cooling source C1 is reduced. In the case where the reflow material 20 is a quartz plate, for example, such a shape of the reflow material 20 is produced by heating the reflow material 20 to about 1600° C. by the second heating source H2, and controlling the temperature of the first heating source H1 to about 800° C. and the temperature of the cooling source C1 to about 100° C.

Note that the micro vibration body 2 may have a joining portion (e.g., columnar quartz member), which is used for joining the micro vibration body 2 to another member such as the mounting substrate 3. Such a joining portion may be joined to the inner wall side of the curved surface portion 201, after the process shown in FIG. 5B, 5C or 5D. The positional relationship of the first heating source H1 and the cooling source C1 in the mold M may be appropriately determined or changed according to the thickness or the shape of the micro vibration body 2 to be finally obtained.

The micro vibration body 2 of the present embodiment can also achieve the similar effects to those of the first embodiment described above. In the present embodiment, the following effects can be further obtained.

(1) In the present embodiment, it is possible to produce the micro vibration body 2 having a partially different shape such as the bottom bulge and the bottom narrowed shape, which cannot be formed by the comparative example in which the reflow material 20 is only subjected to the heating by the second heating source H2. When a direction of the curved surface portion 21 (the portion that was the curved surface portion 201) along a depth direction of the recess part M1 is referred to as a height direction, the thickness distribution of the micro vibration body 2 in the height direction can be controlled desirably. For example, in the manufacturing method of the comparative example, the portion of the reflow material 20 near the through hole M11 of the mold M is thinner than the other portions. On the other hand, in the bottom narrowed shape as produced by the method of the present embodiment, the thickness of the bottom narrowed portion can be increased. In this way, it is possible to control the main resonance frequency by intentionally changing the thickness of the micro vibration body 2 in the height direction, that is, by intentionally differentiating the thickness of the portion that mainly vibrates in the wine glass mode from the thickness of the portion that does not mainly vibrate in the wine glass mode.

Third Embodiment

A third embodiment will be described with reference to FIGS. 6 and 7.

Figure 6:
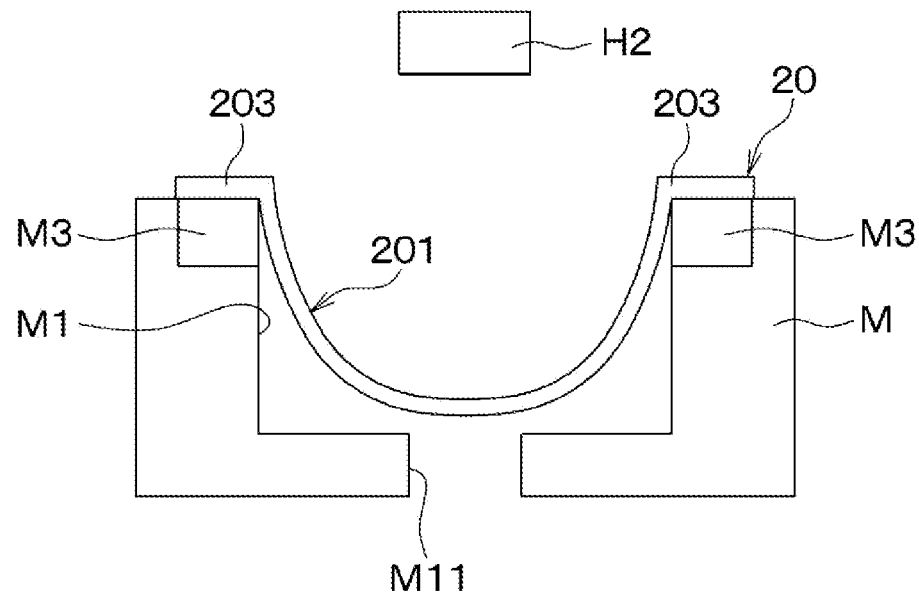
FIG. 6 is a diagram showing an example of a formation process in a manufacturing process of a micro vibration body according to a third embodiment.

A micro vibration body 2 of the present embodiment is produced by using a mold M having a different heat capacity portion M3, for example, as shown in FIG. 6. In the mold M, the different heat capacity portion M3 has a heat capacity different from the other part of the mold M. The micro vibration body 2 is produced in the state where the temperature gradient is generated in the mold M, and is not formed with the recess portion 22. The micro vibration body 2 of the present embodiment is different from the first embodiment in the points mentioned above. Hereinafter, the difference from the first embodiment will be mainly described.

In the present embodiment, the mold M for manufacturing the micro vibration body 2 does not have the support column portion M2, but has the different heat capacity portion M3 at a part. The different heat capacity portion M3 has a heat capacity different from the other part of the mold M, for example, as shown in FIG. 6. That is, the temperature gradient is generated in the mold M during the heat molding of the reflow material 20, in such a manner that the temperature is more increased or less increased in the different heat capacity portion M3 than the other portion of the mold M. The mold M does not support the softened portion of the reflow material 20. For example, the mold M has the different heat capacity portion M3 in the region that is in contact with the reflow material 20 at the upper end of the recess part M1, and the different heat capacity portion M3 has a frame-like shape along the opening portion of the recess part M1.

In the mold M, for example, the main part is a sintered body mainly composed of carbon, and the different heat capacity portion M3 is made of a metal material having a higher thermal conductivity than the main part, or a ceramic having a lower thermal conductivity than the main part. For example, the main part of the mold M and the different heat capacity portion M3 may be formed separately and then integrated with each other. As another example, the main part and the different heat capacity portion M3 may be integrally formed by simultaneously sintering the different heat capacity portion M3 with the sintering of the main part. In addition, the constituent materials of the main part and the different heat capacity portion M3, the arrangement of the different heat capacity portion M3 in the mold M, and the like are not limited to the examples described above.

In a case where the mold M has the different heat capacity portion M3 at the upper end of the recess part M1 and in the region to which the reflow material 20 contacts, and the different heat capacity portion M3 has a larger heat capacity than that of the main part, the reflow material 20 is formed into a shape as shown in FIG. 6, for example. Specifically, in the reflow material 20, as a result of the different heat capacity portion M3 having a higher temperature than the other part of the mold M, the temperature drop at the boundary portion between the curved surface portion 201 and the end portion 203 is suppressed, and an occurrence of the overhang portion 204 is suppressed.

Figure 7:
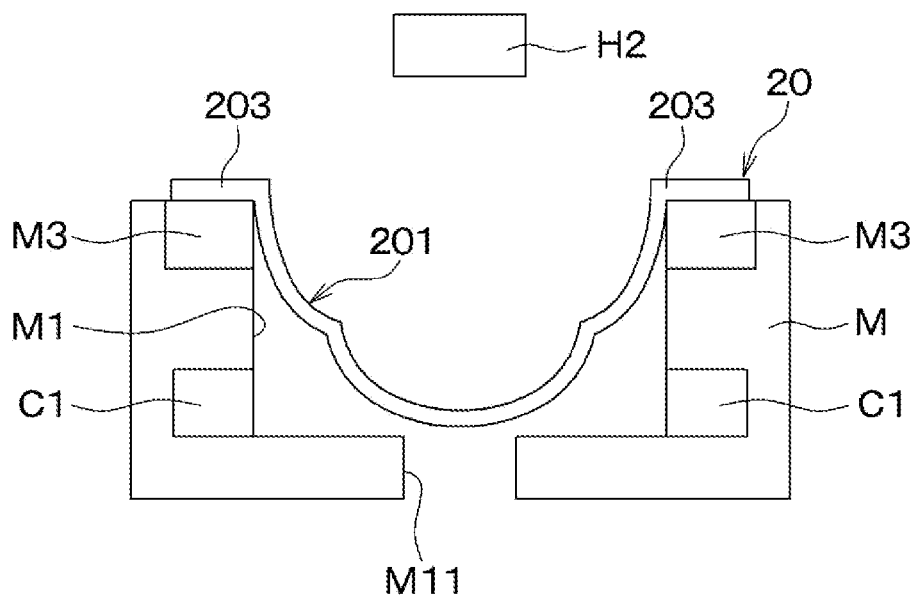
FIG. 7 is a diagram showing a modified example of the formation process in the manufacturing process of the micro vibration body according to the third embodiment.

As another example, the mold M may have the cooling source C1 therein, in addition to the different heat capacity portion M3, for example, as shown in FIG. 7. In this case, the overhang portion 204 does not occur in the reflow material 20, and the curved surface portion 201 has a bottom narrowed shape.

The micro vibration body 2 may have a joining portion by joining the joint portion to the inner wall side of the curved surface portion 201 after the process shown in FIG. 6 or 7, in a similar manner to the second embodiment. The mold M may have a configuration including the first heating source H1 in addition to the different heat capacity portion M3, or may have a configuration including both the first heating source H1 and the cooling source C1 in addition to the different heat capacity portion M3. In such cases, the arrangement relationship of the different heat capacity portion M3, the first heating source H1 and the cooling source C1 in the mold M can be appropriately changed depending on the thickness and shape of the micro vibration body 2 to be finally obtained.

Also in the present embodiment, it is possible to produce the micro vibration body 2 having the similar effects to those of the first embodiment and the second embodiment.

Other Embodiments

Although the present disclosure has been described in accordance with the embodiments, it is understood that the present disclosure is not limited to such embodiments or structures. The present disclosure also includes various modifications and variations within an equivalent range. In addition, various combinations and modes, and further, other combinations and modes including one element of these alone, or thereabove, or therebelow, are also comprised within the scope or concept range of the present disclosure.

Figure 8:
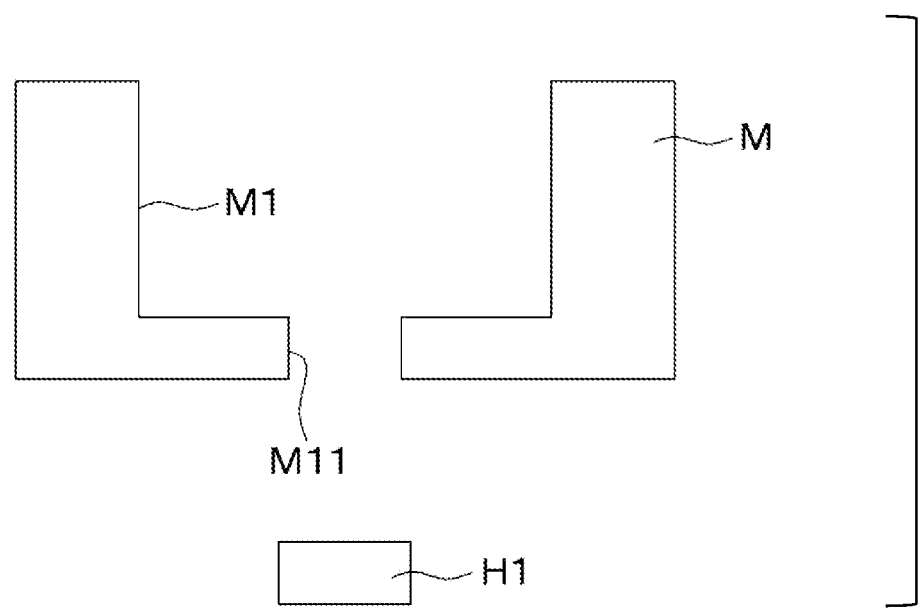
FIG. 8 is a diagram showing another example of a configuration in which a part of a mold is heated in the formation process of the micro vibration body.

(1) For example, in each of the embodiments described above, the first heating source H1 may be arranged outside the mold M, as shown in FIG. 8. In this case, the first heating source H1 is, for example, a torch, a heater, a lamp, a hot air generator, or the like, and heats a part of the mold M from the outside. Further, the cooling source C1 may be similarly arranged outside the mold M. In such a case, the cooling source C1 is, for example, a cold air generator, and cools a part of the mold M from the outside. In a case where the first heating source H1 and the cooling source C1 are both arranged outside of the mold M, the arrangements of the first heating source H1 and the cooling source C1 can be appropriately changed.

(2) In each of the embodiments described above, in a case where the mold M has at least one of the first heating source H1 or the cooling source C1, only one first heating source H1 or only one cooling source C1 is exemplarily arranged inside or outside of the mold M. However, two or more first heating sources H1 and/or two or more cooling source C1 may be arranged. In such a case, the first heating sources H1 or the cooling sources C1, each in the frame-like shape, may be arranged at plural positions. Alternatively, the first heating sources H1 or the cooling sources C1, each in an individual piece shape, may be arranged so as to be scattered.

(3) In the third embodiment described above, the example in which the mold M has one different heat capacity portion M3 has been described. Alternatively, the mold M may have a plurality of different heat capacity portions M3.

(4) In the first embodiment described above, the configuration in which the first heating source H1 is integrated into the mold M. However, the configuration is not limited to the example described. For example, the mold M having the support column portion M2 may have a configuration in which the cooling source C1 is incorporated instead of the first heating source H1, or a configuration in which both the first heating source H1 and the cooling source C1 are incorporated.

(5) In the second and third embodiments, the example in which the mold M does not have the support column portion M2 has been described. Alternatively, the mold M may have the support column portion M2.

What is claimed is:

1. A method for manufacturing a micro vibration body having a three-dimensional curved surface, the method comprising:
preparing a mold having a recess part;
arranging a plate-shaped reflow material on the mold so as to cover the recess part with the reflow material, the reflow material having a lower surface facing the recess part, and an upper surface opposite to the lower surface;
reducing pressure in a space defined by the recess part covered with the reflow material; and
deforming the reflow material by means of the pressure reduced in the recess part, while heating the reflow material on a side adjacent to the upper surface to soften the reflow material,
wherein
the deforming of the reflow material includes at least one of heating a part of the mold or cooling a part of the mold, the at least one of the heating the part of the mold or the cooling the part of the mold is performed to generate a temperature gradient on an inner side wall of the recess part along a depth direction of the recess part, and the at least one of the heating the part of the mold or the cooling the part of the mold is performed by a heating source or a cooling source provided in the inner side wall of the recess part of the mold, the heating source or cooling source being configured to convert energy to heat.

2. The method according to claim 1, wherein
the at least one of the heating the part of the mold or the cooling the part of the mold is performed in a region of the mold with which the reflow material is not in contact.

3. The method according to claim 1, wherein
the part of the mold is provided by a different heat capacity portion that is provided by a material having different heat capacity from another part of the mold.

4. The method according to claim 1, wherein
the mold has a support column portion protruding from a bottom surface of the recess part toward an opening of the recess part to be in contact with a portion of the reflow material softened.

5. A method for manufacturing a micro vibration body having a three-dimensional curved surface, the method comprising:
preparing a mold having a recess part;
arranging a plate-shaped reflow material on the mold so as to cover the recess part with the reflow material, the reflow material having a lower surface facing the recess part, and an upper surface opposite to the lower surface;
reducing pressure in a space defined by the recess part covered with the reflow material; and
deforming the reflow material by means of the pressure reduced in the recess part, while heating the reflow material on a side adjacent to the upper surface to soften the reflow material, wherein
the mold has a different heat capacity portion at a part in an inner side wall of the recess part along a depth direction of the recess part, the different heat capacity portion is provided by a material having a heat capacity different from another part of the inner side wall of the recess part of the mold along the depth direction, and in the deforming of the reflow material, the mold having the different heat capacity portion is used to generate a temperature gradient i-s-generated on the inner side wall of the recess part along the depth direction in the mold.

6. The method according to claim 5, wherein
the mold has a support column portion protruding from a bottom surface of the recess part toward an opening of the recess part to be in contact with a portion of the reflow material softened.

7. A method for manufacturing a micro vibration body having a three-dimensional curved surface, the method comprising:
preparing a mold having a recess part;
arranging a plate-shaped reflow material on the mold so as to cover the recess part with the reflow material, the reflow material having a lower surface facing the recess part, and an upper surface opposite to the lower surface;
reducing pressure in a space defined by the recess part covered with the reflow material; and
deforming the reflow material by means of the pressure reduced in the recess part, while heating the reflow material on a side adjacent to the upper surface to soften the reflow material,
wherein
the deforming of the reflow material includes at least one of heating a part of the mold or cooling a part of the mold,
the mold has a different heat capacity portion at a part in an inner side wall of the recess part along a depth direction of the recess part, the different heat capacity portion is provided by a material having a heat capacity different from another part of the inner side wall of the recess part of the mold along the depth direction, and
the at least one of the heating the part of the mold or the cooling the part of the mold is performed to generate a temperature gradient on an inner side wall of the recess part along a depth direction of the recess part.

8. The method according to claim 7, wherein
the at least one of the heating the part of the mold or the cooling the part of the mold is performed by a heating source or a cooling source arranged outside the mold.

* * * * *